United States Patent [19]
daSilva et al.

[11] Patent Number: 5,345,332
[45] Date of Patent: * Sep. 6, 1994

[54] FIBER AMPLIFIER CASCADE FOR MULTIWAVELENGTH LIGHTWAVE COMMUNICATIONS SYSTEM

[75] Inventors: Valeria L. daSilva, Tinton Falls; Lars E. Eskildsen, Atlantic Highlands; Evan L. Goldstein, Princeton; Yaron Silberberg, West Windsor Township, Mercer County, all of N.J.

[73] Assignee: Bell Communications Research, Inc., Livingston, N.J.

[ * ] Notice: The portion of the term of this patent subsequent to Aug. 24, 2010 has been disclaimed.

[21] Appl. No.: 56,098

[22] Filed: May 3, 1993

[51] Int. Cl.$^5$ .............................................. H01S 3/30
[52] U.S. Cl. ..................................... 359/341; 359/160
[58] Field of Search ....................... 359/341, 342, 160; 372/23.6

[56] References Cited

U.S. PATENT DOCUMENTS

| | | | |
|---|---|---|---|
| 5,239,607 | 8/1993 | Da Silva et al. | 385/122 |
| 5,245,467 | 9/1993 | Grasso et al. | 359/342 X |
| 5,260,823 | 11/1993 | Payne et al. | 359/341 |

OTHER PUBLICATIONS

"Modeling Erbium-Doped Fiber Amplifiers", C. R. Giles, E. Desurvine, *Journal of Lightwave Technology*, vol. 9, No. 2, pp. 271–283, Feb. 1991.

"Equalization in Amplified WDM Lightwave Transmission Systems", A. Chraplyvy, J. Nagel R. Tkach, *IEEE Photon. Technol. Lett., vol. 4, No. 8, pp. 920–922, Aug. 1992.*

"Tunable Gain Equalization Using a Mach–Zehnder Optical Filter in Multistage Fiber Amplifiers", K. Inoue, T. Kominato, H. Toba, *IEEE Photon. Technol. Lett.*, vol. 3, No. 8, pp. 718–720, Aug. 1991.

"Gain Equalization in Multiwavelength Lightwave Systems Using Acoustooptic Tunable Filters", S. Su, R. olshansky, G. Joyce, D. Smith, J. Baran, *IEEE Photon. Technol. Lett.*, vol. 4, No. 3, pp.269–271, Mar. 1992.

*Primary Examiner*—Mark Hellner
*Attorney, Agent, or Firm*—Leonard Charles Suchyta; Stephen M. Gurey

[57] ABSTRACT

In a multiwavelength lightwave communications system channel-by-channel power regulation is achieved with a cascade of inhomogeneously broadened saturated fiber amplifiers spaced along the optical fiber transmission path. In the described embodiment, inhomogeneous broadening is achieved by immersing each of the erbiumdoped fiber amplifiers in the cascade in a bath of liquid nitrogen, thereby cooling each amplifier to approximately 77 K.

15 Claims, 2 Drawing Sheets

FIBER AMPLIFIER CASCADE FOR MULTIWAVELENGTH LIGHTWAVE COMMUNICATIONS SYSTEM

BACKGROUND OF THE INVENTION

This invention relates to lightwave communications systems, and more particularly to multiwavelength lightwave communications systems.

In single wavelength long distance optical communications systems fiber amplifiers, such as erbium-doped fiber amplifiers, are periodically spaced along the fiber path to compensate for the transmission losses that accumulate as the light traverses the transmission fibers and other optical components along the system. The gain of each amplifier in the cascade can match the signal loss in the portion of the transmission path that follows the previous amplifier in the cascade. It is known (see, e.g., C. R. Giles and E. Desurvire, "Modeling Erbium-Doped Fiber Amplifiers", *Journal of Lightwave Technology,* Vol. 9, No. 2, pp. 271-283, February 1991) that a cascade of saturated fiber amplifiers acts to self-regulate the signal power through the transmission system. Accordingly, the power output of the first amplifier in a cascade of saturated fiber amplifiers is duplicated at the output of all the subsequent amplifiers along the system.

There is currently considerable interest in building large, multiwavelength communications systems to support the envisioned high-capacity information networks of the future. Such multiwavelength systems will advantageously have increased signal carrying capacity. Furthermore, and even more significantly, the multiple wavelengths will be used for the purposes of signal routing. As in the single-wavelength optical communications systems, in multiwavelength systems cascades of optical amplifiers will be required to compensate for the losses that accumulate as the light traverses the transmission fibers, and the larger losses that the signals encounter from the optical switches and routers along the optical signal path.

The most significant technical obstacle standing in the way of such large, amplified multiwavelength communications systems is the nonuniform gain spectrum of fiber amplifiers. Although amplifier gain spectra are typically flat within three decibels over a bandwidth of approximately 20 nm, these relatively modest gain nonuniformities in a single amplifier will accumulate along a cascade, resulting in exponentially rising interchannel power variations. For example, a 3-dB difference in the gain at one wavelength as compared to the gain at a second wavelength, when accumulated through ten cascaded amplifier stages, results in a power ratio equal to one-thousand. Therefore, the weaker channels in a wavelength-multiplexed system are likely to fall to power and signal-to-noise ratio levels that render them undetectable. Such behavior is in effect fundamental and inherent in the spectroscopy of erbium ions in silica glass, which is the only material system, so far, that has succeeded in providing practical optical gain for lightwave communications systems. It is because of this fundamental property of the erbium ions in the silica glass that the power regulation noted above as being achievable with a cascade of saturated fiber amplifiers in a single wavelength optical system will not be effective in a multiwavelength optical system. Specifically, in a multiwavelength system, the output of each conventional fiber amplifier will be regulated on a total power basis, and not on a channel-by-channel basis.

Various prior art approaches to this problem have been proposed. In a first approach (A. R. Chraplyvy, J. A. Nagel, and R. W. Tkach, "Equalization in Amplified WDM Lightwave Transmission Systems", IEEE *Photon. Technol. Lett.,* Vol. 4, No. 8, pp. 920-922, August 1992) the transmitter power is selectively boosted for wavelengths that propagate weakly through the system. Such an approach may be effective in modest-size point-to-point links, but is not promising in networks, especially those with dynamically reconfiguring signal paths. A second approach (K. Inoue, T. Kominato, and H. Toba, "Tunable Gain Equalization Using a Mach-Zehnder Optical Filter in Multistage Fiber Amplifiers", IEEE *Photon. Technol. Lett.,* Vol. 3, No. 8, pp. 718-720, August 1991) uses fixed filters to selectively suppress wavelengths that propagate too strongly. This approach has also achieved some success, but it is not adjustable in the event of component or amplifier-inversion-level variations. Moreover, it cannot be scaled to very large system sizes due to critical matching difficulties. In a third approach (S. F. Suet al, "Gain Equalization in Multiwavelength Lightwave Systems Using Acoustooptic Tunable Filters", IEEE *Photon. Technol. Lett.,* Vol. 4, No. 3, pp. 269-271, March 1992) channel-suppression filters are embedded in servo-loops, one servo-loop being used per channel per amplifier. Although it is in principle effective, this approach is complex. Furthermore, this thud approach imposes increased system losses that must themselves be compensated for by additional gain stages.

An object of the present invention is to provide in a multiwavelength lightwave communications system power regulation on a channel-by-channel basis with a minimum of optical component complexity.

SUMMARY OF THE INVENTION

In the multiwavelength lightwave communications system of the present invention power regulation on a channel-by-channel basis is achieved with a cascade of inhomogeneously broadened saturated fiber amplifiers. In a conventional homogeneously broadened fiber amplifier all channels are coupled to a single collection of gain-giving erbium ions. Thus when a channel saturates the gain of a conventional fiber amplifier, it depresses not only its own gain, but also the gain at other wavelengths in the system. Therefore, spectral power variations accumulate in such conventional amplifier cascades. In an inhomogeneously broadened fiber amplifier, on the other hand, each channel interacts with its own private set of erbium ions. We have recognized in the present invention that a saturated cascade of inhomogeneously broadened fiber amplifiers will exhibit saturation-induced self-regulation of signal power on a channel-by-channel basis, and thereby behave as a parallel overlay of separate self-regulating amplifiers, one for each channel. In the specific embodiment disclosed, such inhomogeneous broadening is achieved by cooling the saturated erbium-doped fiber amplifiers in the cascade in a liquid nitrogen bath. Other methods of achieving inhomogeneous broadening of fiber amplifiers are also suggested.

DETAILED DESCRIPTION

Figure 1:
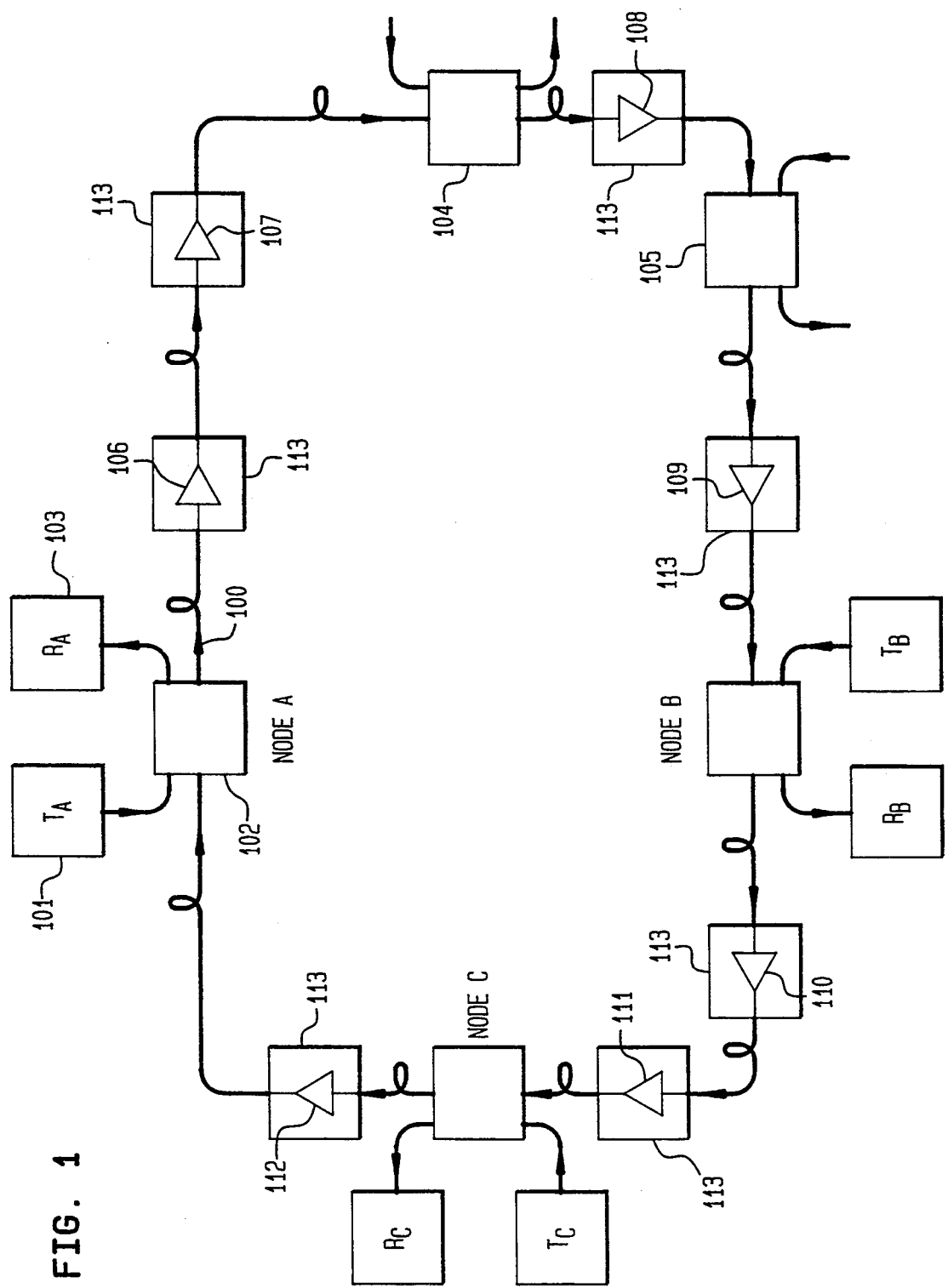
FIG. 1 is a block diagram of a multiwavelength optical communications system in accordance with the present invention.

With reference to FIG. 1, an example of a multiwavelength optical communications system is shown. This is an example of a typical ring network. Multiple wavelength optical communications networks can also be configured in a bus or tree format, or in any combination thereof. The network shown in FIG. 1 consists of three nodes, node A, node B, and node C. At node A, a transmitter ($T_A$) 101 couples signals to be transmitted at one or multiple wavelengths through a wavelength-selective switch 102 onto the ring 100. Simultaneously switch 102 couples signals directed to that node at one or plural wavelengths from the ring to the receiver ($R_A$) 103. In a similar manner the transmitters, $T_B$ and $T_C$, and receivers $R_B$ and $R_C$, at nodes B and C couple signals onto and off of the ring 100.

The communications system in FIG. 1 also includes wavelength-selective switches 104 and 105. Each of these switches serves to couple signal channels at one or more specific wavelengths off ring 100 and onto another ring, bus or tree network (not shown) and from that other ring, bus or tree network onto ring 100. Accordingly, through the use of such wavelength-selective devices, routing of signals at selected wavelengths to specific destinations can be achieved.

The communications system in FIG. 1 includes seven optical amplifiers 106–112 to compensate for the losses encountered by the multiple wavelength channel signals both from the normal attenuation losses from transmission over lengths of optical fiber and from the losses introduced by the various and generally lossy wavelength-selective devices through which the signals pass as they traverse the ring. Erbium-doped fiber amplifiers provide high gain over a wide bandwidth and are therefore particularly useful in optical communications systems to compensate for attenuation losses. As noted hereinabove, however, in conventional amplifier cascades, spectral gain nonuniformities across the amplifier bandwidth will cause different wavelength channels to be amplified by different gain factors. Small gain differences, which can be tolerated through a single amplifier stage, accumulate as the channels are amplified through the cascade of amplifiers, and result in significant differences in the power levels of the multiple channels at the output of the last amplifier stage. As a result, the power level of some channels may be reduced to levels that make them virtually undetectable. Although the system of FIG. 1 shows, for example, the channels transmitted from the transmitter $T_A$ of node A to the receiver $R_C$ of node C, traversing a cascade of six amplifier stages, 106–111, in a larger, useful, system there are likely to be more amplifier stages. Thus, as previously noted, a small difference in power levels between two channels through one amplifier stage will result in very large accumulated power differences.

Spectral power variations in conventional cascades accumulate because they are homogeneously broadened. This means that when a channel saturates the gain of a conventional fiber amplifier, it depresses not only its own gain, but also that at all other wavelengths in the system. This occurs because all channels are coupled to a single collection of gain-giving erbium ions. What is desired is for each channel to interact with its own private set of erbium ions. Such an amplifier is called "inhomogeneously broadened." What we have invented is a multiwavelength optical lightwave communications system in which inhomogeneously broadened fiber amplifiers are placed in a saturated cascade. Such a system will exhibit saturation-induced self-regulation of signal power on a channel-by-channel basis. The saturation effects behave as a servo-loop, and due to the decoupling effect of the inhomogeneous gain, the servo-loop effect operates on a channel-by-channel basis. Thus, inhomogeneously broadened amplifiers placed in a saturated cascade will behave as a parallel overlay of separate self-regulating amplifiers, one for each channel.

In a specific embodiment of the present invention, saturated amplifiers in a cascade are rendered inhomogeneous by cooling them in liquid-nitrogen baths, thus suppressing the homogeneous broadening mechanisms that are present at room temperature. Thus in FIG. 1, a box 113 is shown placed around each of the amplifiers 106–112 to represent the liquid-nitrogen bath in which the fiber amplifiers sits.

In order to test the present invention, an experimental arrangement was set up consisting of a cascade of six 20 m-long erbium-doped aluminosilicate fiber amplifiers. Each amplifier was co-directionally pumped with 11 dBm of light at 1480 nm. The 20 m-long doped fibers were wound into coils of 6-cm diameter so they could be immersed in liquid nitrogen at $\sim$77 K. Each fiber amplifier was separated from its successor by a transmission fiber with about 10 dB of loss. The transmission path contained neither optical filters nor, apart from the inhomogeneous amplifiers themselves, any special channel-power-equalizing components.

Five wavelength-multiplexed channels ranging from 1546 nm to 1560 nm at −15 dBm per channel were coupled into the first amplifier. Interchannel wavelength separations were about 4 nm which is considerably larger than the measured $\sim$1-nm homogeneous linewidth of amplifiers at 77 K. The optical power spectra emerging from each amplifier stage was measured under two conditions: with all amplifiers at room temperature ($\sim$293 K), and thus homogeneously broadened, and with all at 77 K, and thus inhomogeneously broadened.

Figure 2:
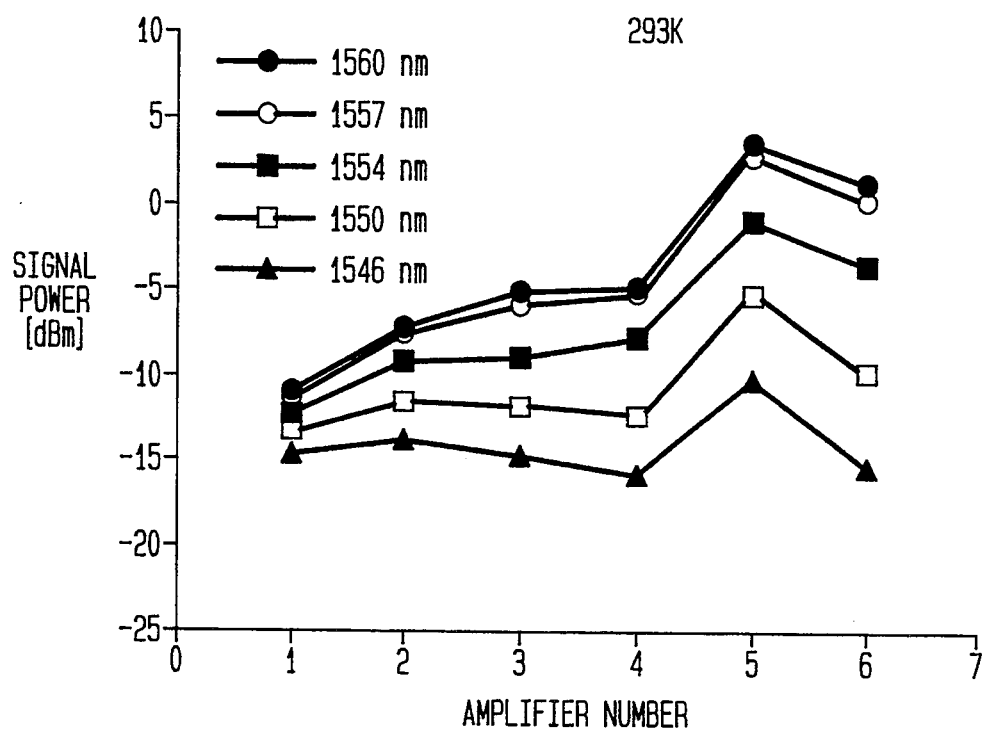
FIG. 2 is a graph showing channel output power versus amplifier number for an experimental setup of a five-channel system which includes six cascaded saturated fiber amplifiers at room temperature.
Figure 3:
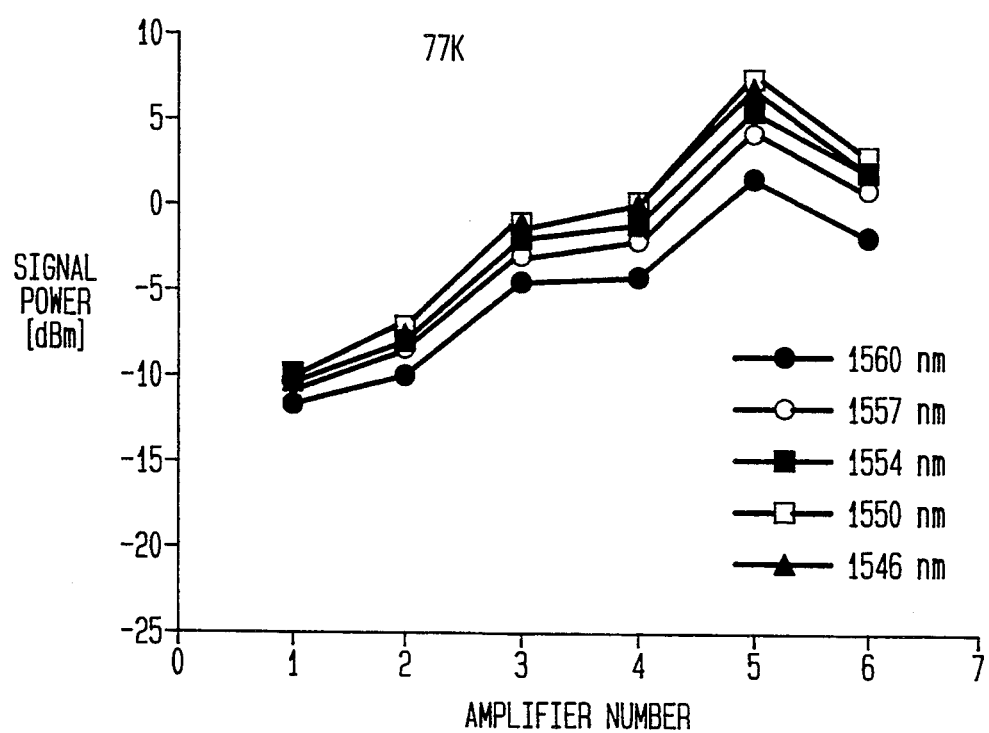
FIG. 3 is a graph showing channel output power versus amplifier number for that same experimental setup but where each of the fiber amplifiers has been cooled in a liquid nitrogen bath to achieve the desired inhomogeneous broadening effect.

FIGS. 2 and 3 are graphs of plots of the output power of the five wavelengthmultiplexed signals versus amplifier number at room temperature and 77 K, respectively. In the room temperature graphs of FIG. 2, it can be noted that after the first amplifier, the signals vary in power by a modest 3 dB. However, after the sixth amplifier the variation has accumulated to about 17 dB, with the weakest channel at 1546 nm, transporting only about −16 dBm. Most importantly, the interchannel power variations are clearly accumulating rapidly as the signals pass the fourth, fifth and sixth amplifier, with the interchannel power spread accumulating at the rate of about 3 dB per stage.

From the graphs of the amplifier outputs at 77 K in FIG. 3, it is evident that in the first few amplifiers the signal powers spread out slightly as a result of the wavelength-dependence of the amplifiers' saturation power. However, alter about the third amplifier, this interchannel spreading has either diminished or stopped completely. Such behavior would be expected in a gain medium dominated by inhomogeneous broadening. Specifically, in FIG. 3 it is noted that the interchannel power spread is about 5 dB by the fourth amplifier, after which the accumulation has slowed greatly or has stopped altogether.

Although inhomogeneous broadening of each of the fiber amplifiers in the cascade described hereinabove is achieved by cooling the fiber amplifier to suppress the homogeneous parts of the amplifier, suppressing the homogeneous parts can also be achieved by means other than cooling to such low temperatures. For example use of different types of co-dopants in the core of the fiber are known to affect the homogeneity of the fiber. Another family of glasses, such as erbium ions in fluoride glasses, are also likely to be more inhomogeneous. Also, the introduction of disturbances in the host glass are likely to make them more strongly inhomogeneous.

The above-described embodiment is illustrative of the principles of the present invention. Other embodiments may be devised by those skilled in the art without departing from the spirit and scope of the invention.

What is claimed is:

1. A multiwavelength lightwave communications system comprising:

an optical transmission medium;

an optical transmitter for transmitting plural signal channels at a plurality of wavelengths onto said optical transmission medium;

an optical receiver for receiving plural signal channels at at least some of said plurality of wavelengths from said optical transmission medium;

a cascade of fiber amplifiers, said cascade connected along said optical transmission medium between said optical transmitter and said optical receiver, each fiber amplifier in the cascade amplifying the transmitted plural signal channels at least some of said plurality of wavelengths, said cascade of fiber amplifiers being a cascade of inhomogeneously broadened fiber amplifiers operated in gain saturation.

2. In a multiwavelength lightwave communications system in which plural channels at a plurality of wavelengths are transmitted on an optical fiber, amplifying means for amplifying said plural channels at said plurality of wavelengths, said means comprising a plurality of fiber amplifiers spaced along said optical fiber, each of said plurality of fiber amplifiers being a inhomogeneously broadened fiber amplifier operated in gain saturation.

3. A multiwavelength amplifier for amplifying a plurality of channels at a plurality of wavelengths in a multiwavelength lightwave communications system comprising a inhomogenously broadened fiber amplifier operated in gain saturation.

4. A multiwavelength lightwave communication system comprising:

an optical transmission medium;

an optical transmitter for transmitting plural signal channels at a plurality of wavelengths onto said optical transmission medium;

an optical receiver for receiving plural signal channels at at least some of said plurality of wavelengths from said optical transmission medium;

a cascade of fiber amplifier, said cascade connected along said optical transmission medium between said optical transmitter and said optical receiver, each fiber amplifier in the cascade amplifying the transmitted plural signal channels at at least some of said plurality of wavelengths, said cascade of fiber amplifiers being a cascade of inhomogeneously broadened erbium-doped fiber amplifiers operated in gain saturation, said erbium-doped fiber amplifiers in said cascade being inhomogeneously broadened by cooling them to a temperature substantially below room temperature.

5. In a multiwavelength lightwave communications system in which plural channels at a plurality of wavelengths are transmitted on an optical fiber, amplifying means for amplifying said plural channels at said plurality of wavelengths, said means comprising a plurality of fiber amplifiers spaced along said optical fiber, each of said plurality of fiber amplifiers being an inhomogeneously broadened fiber amplifier operated in gain saturation that inhomogeneously broadened by cooling it to a temperature substantially below room temperature.

6. A multiwavelength amplifier for amplifying a plurality of channels at a plurality of wavelengths in a multiwavelength lightwave communications system comprising a inhomogenously broadened erbium-doped fiber amplifier operated in gain saturation, said erbium-doped fiber amplifier being inhomogeneously broadened by cooling it to a temperature substantially below room temperature.

7. A multiwavelength lightwave communications system in accordance with claim 1 wherein the fiber amplifiers in said cascade are erbium-doped fiber amplifiers.

8. A multiwavelength lightwave communications system in accordance with claim 4 wherein the erbium-doped fiber amplifiers are cooled by immersing the fiber amplifiers in a bath of a low temperature liquid.

9. A multiwavelength lightwave communications system in accordance with claim 8 wherein the low temperature liquid is liquid nitrogen.

10. Amplifying means in accordance with claim 2 wherein said fiber amplifiers are erbium-doped fiber amplifiers.

11. Amplifying means in accordance with claim 5 wherein said erbium-doped fiber amplifiers are cooled by immersing them in a low temperature liquid.

12. Amplifying means in accordance with claim 11 wherein the low temperature liquid is liquid nitrogen.

13. A multiwavelength amplifier in accordance with claim 3 wherein the fiber amplifier is an erbium-doped fiber amplifier.

14. A multiwavelength amplifier in accordance with claim 6 wherein the erbium-doped fiber amplifier is cooled by immersing the fiber amplifier in a bath of a low temperature liquid.

15. A multiwavelength amplifier in accordance with claim 14 wherein the low temperature liquid is liquid nitrogen.

* * * * *

UNITED STATES PATENT AND TRADEMARK OFFICE
CERTIFICATE OF CORRECTION

PATENT NO. : 5,345,332
DATED : September 6, 1994
INVENTOR(S) : Valeria L. DASILVA et al.

It is certified that error appears in the above-indentified patent and that said Letters Patent is hereby corrected as shown below:

In Abstract, line 7, change "erbiumdoped" to --erbium-doped--.

Column 5, line 38, change "at least" to --at at least--.

Column 6, line 4, change "amplifier" to --amplifiers--.

Column 6, line 23, change "broadened fiber" to --broadened erbium-doped fiber--.

Signed and Sealed this

Twenty-fifth Day of May, 1999

*Attest:*

Q. TODD DICKINSON

*Attesting Officer*      Acting Commissioner of Patents and Trademarks